United States Patent Office 3,177,164
Patented Apr. 6, 1965

3,177,164
PROCESS FOR FOAMING A MIXTURE OF ASPHALT AND A COPOLYMER OF ETHYLENE AND VINYL ACETATE AND PRODUCT PRODUCED THEREFROM
Ivor W. Mills, Glenolden, Pa., William J. Stout, Wilmington, Del., and Luther Le Master Yaeger, Houston, and Joel Nelson Lipscomb, Freeport, Tex., assignors to Sun Oil Company, Philadelphia, Pa., a corporation of New Jersey
No Drawing. Filed Jan. 18, 1963, Ser. No. 252,301
5 Claims. (Cl. 260—2.5)

This invention relates to a foam composition containing a major amount of asphalt and to the process of making the same. More particularly the invention relates to a foamed asphalt-resin composition having improved properties and characteristics and to an improved foaming process.

Asphalt has been foamed by various methods in the past; however, the foams were very brittle and fragile or too dense depending on the cell size of the final foam.

We have found that excellent foams can be made by foaming mixtures of asphalt and an ethylene-vinyl acetate copolymer resin. In another embodiment we have found that a combination blowing agent consisting of an alkali or alkaline earth metal hydride and a hydrated inorganic material produces high quality foams. In still another embodiment we have found that the action of blowing agents is improved by coating them with a thermoplastic resin prior to use in foaming.

The invention will be more readily understood by referring to the following description and illustrative examples.

Suitable asphalts are those derived from petroleum refining operations such as vacuum distillation, solvent extraction and oxidation processes or combinations of these. Natural asphalts can be used as well. Asphalts having ring and ball softening points (ASTM–D 36–26) ranging from 150 to 350° F. can be employed to make the foams of the invention.

The synthetic resin component of the foam is a normally solid copolymer of ethylene and vinyl acetate. A method for preparing the copolymer is disclosed in United States Patent Number 2,200,429 to Perrin et al. Generally, the preparation involves copolymerizing a mixture of ethylene and vinyl acetate by means of a free-radical-producing catalyst, such as oxygen or an organic peroxide, at a pressure of 100 to 200 atmospheres and a temperature in the range of 150 to 250° C. and recovering the product. The proportion of ethylene to vinyl acetate in the resin can be varied considerably. For purposes of the present invention the resin contains from 5 to 15 moles of ethylene per mole of vinyl acetate, preferably 7 to 9 moles per mole of vinyl acetate.

The amount of resin added to the asphalt can vary from 5 to 50 weight percent, preferably from 5 to 20 weight percent.

Any suitable mixing and foaming method and equipment can be used which results in a good distribution of the ingredients prior to the foaming step. The usual procedure is to blend the asphalt and resin with heating to provide a homogeneous mixture and to add the blowing agents in a subsequent step.

Blowing agents which yield gas by physical heating or chemical reaction are well known. The gases they yield are carbon dioxide, ammonia, methane, chlorofluoromethanes, hydrogen, nitrogen, nitrous oxide, carbon monoxide and water vapor. Specific examples include sodium and potassium boro-hydride, the Freons—(trichlorofluoromethane), water, lithium hydride, calcium hydride sodium hydride, ammonium bicarbonate, sodium bicarbonate, Nitrosan (N,N$^1$-dimethyl, N,N$^1$-dinitroso terephthal amide), $CaSO_4 \cdot NH_2O$, hydrated calcium citrate, hydrated sodium phosphate, hydrated sodium sulfite and sodium borates (e.g. borax). Any of these conventional blowing agents can be used in the process of the invention, but they do not necessarily give equivalent results.

A feature of the invention is the use of a particular two component gas producing system as the blowing agent. Hydrated calcium sulfate (gypsum) is produced as a by-product in the processing of phosphate rock and thus it is available at very low cost. The gypsum performs two functions in foaming the asphalt-copolymer resin blend in that the water of hydration split off on heating produces water vapor and the remaining calcium sulfate provides a stiffening action which greatly reduces the tendency of the foam to collapse. Alkali metal and alkaline earth metal hydrides, e.g. sodium hydride, potassium hydride, lithium hydride are very vigorous gas producers and they perform exceptionally well in foaming the dense starting material of the invention.

Another feature of the invention is the use of a resin encapsulated blowing agent. We have found that the severity of foaming can be moderated by coating the blowing agent with a thermoplastic resin before it is added to the reaction mixture. Suitable resins include polyethylene, polypropylene and copolymers of ethylene and vinyl acetate. In general, resins which are solids at ambient temperature (30–130° F.), have melt points ranging from about 180–400° F. and which are soluble or partially soluble in aromatic hydrocarbon solvents such as benzene or equivalent solvents are suitable. Those skilled in the art can select the proper resin solvent and coating conditions for use with a particular blowing agent. For use with gypsum and borax blowing agents the copolymers of ethylene and vinyl acetate described in this specification are particularly effective. Coating thicknesses of from about 0.05 to 2.0 mils can be used.

The foaming step can be accomplished by batchwise mixing, by extrusion, or by continuous hot melt blending. The asphalt-copolymer resin blend is heated to a temperature of from about 400° F. to about 700° F. and the blowing agents added with high speed stirring. Foaming beings immediately and continues for a period of 5–20 minutes depending upon batch size and the amounts and types of additives. The foaming step can be done under pressure if desired but pressurization is not required. Pressures of 1 to 10 atmospheres are suitable with atmospheric pressure being preferred.

The asphalt used in the following examples was a high melt point air blown material having the following specifications—

Specific gravity, 60° F. _____ 1.064
Penetration, 77° F. (50 g., 5 sec.) _____ 0
Softening point, ° F. (R&B) _____° F.___ 302
Viscosity—Saybolt Furol (450° F.) _____ secs__ 327
Ramsbottom carbon _____ percent__ 35

The synthetic resin copolymer used was "Elvax 240" (Du Pont Chemical Company), having the following properties:

Inherent viscosity at 30° C. (0.25 wt. percent in
  toluene) _____ 0.78
Ethylene/vinyl acetate ratio, wt. percent _____ 72:28
Melt index (ASTM D–1238–57 T) _____ 25
Density g./cc. @ 30° C. _____ 0.95
Refractive index, $N_D{}^{25}$ _____ 1.485
Ring and ball S.P. (° F.) _____ 255

In general, ethylene-vinyl acetate copolymers having ring and ball softening points ranging from 230 to 290° F. can be used. Those having a ring and ball softening point of 250–280° F. are preferred.

The by-product gypsum blowing agent had the following chemical analysis:

$CaSO_4$—63.85 wt. percent, water of crystallization—16.5 wt. percent, free water—11.24 wt. percent, other inorganic salts—8.31 wt. percent, pH—4.2. The gypsum is added in amounts ranging from 5 to 20 wt. percent based on the asphalt.

The hydride blowing agents were those readily available on the market. From ½ to 20 wt. percent hydride is used, based on the asphalt.

The type of blowing agent is not limited to those employed in the examples and those skilled in the art can select from those known in the prior art. Proper amounts can be determined experimentally. Generally, from ½ to 30 wt. percent blowing agent or combination blowing agents can be used.

The technique followed in producing the foams of Table 1 was as follows; the asphalt was placed in a five quart container and heated to about 600° F. The copolymer resin was added slowly in pellet form with high speed, high shear stirring until a homogeneous mixture was produced. The mixture occupied about one fourth of the container. Heating was discontinued and the hydride was added in paste form. The paste consisted of 25 to 50 wt. percent hydride in Buton A–500 resin, a low molecular weight styrene-butadiene copolymer having a density of 7.65 lbs./gal. at 23° C. The resin was used as a dispersing medium for the hydride which is a powder in the natural state. The hydride was dispersed. Gypsum was sifted on top of the melt after the hydride was well dispersed and the blowing agents further dispersed in the asphalt-copolymer blend with rapid mixing employing a motor driven stirrer. The time interval between hydride and gypsum additions is not critical, in fact, the hydride asphalt-resin dispersion can be solidified, stored, and shipped—remelted and the hydride activated by gypsum addition when foaming is desired. The thermometer and mixer were removed and the mass allowed to rise and cool without disturbance. Density and compressive strengths were determined using 1.0 inch cubes of the foam. Creep and compression set were determined using 1.5 inch cubes. These cubes were placed on a metal sheet and an annular steel ring imparting a load of 8 gm./cm.$^2$ was placed on the top surface. The loaded samples were then heated in an oven at a constant temperature of 250° F. If no dimentional change occurred or no indentation was caused by the ring, the sample is deemed suitable for 250° F. service.

The foam samples had the following ingredients:

TABLE I

| Component | Formulation (parts by wt.) | | | |
|---|---|---|---|---|
| | A | B | C | D |
| Asphalt | 350 | 400 | 450 | 375 |
| Copolymer | 150 | 100 | 50 | 125 |
| Lithium hydride (50% paste) | 10 | | 10 | |
| Sodium hydride (25% paste) | | 20 | | 10 |
| By-product gypsum | 30 | 30 | 30 | 30 |

A control sample was made by following the foaming procedure outlined above-leaving out the copolymer resin. A comparison of the foams is given below:

TABLE II

| Formulation | Weight Percent Copolymer | Compressive Strength (p.s.i.g.) | Specific Gravity | Density (lb./cu. ft.) | Creep (1 hr. @ 250° F.) | Compression Set (1 hr. @ 250° F.) |
|---|---|---|---|---|---|---|
| Control | 0 | 2 | .22 | 13.7 | 0 | 0 |
| A | 30 | 22.5 | .28 | 17.4 | 0 | 0 |
| B | 20 | 15 | .40 | 25 | 0 | 0 |
| C | 10 | 35 | .39 | 24.2 | 0 | 0 |
| D | 25 | 90 | .43 | 26.7 | 0 | 0 |

The data show that the asphalt-ethylene-vinyl acetate copolymer foams of the invention have high compressive strength and good high temperature properties. Foams containing no polymer are brittle and shatter when they are struck a sharp blow. The foams of the invention recover well from applied deformation. Furthermore, the foams can be used under high temperature conditions where foams of polystyrene and polyethylene shrink or collapse. Asphalt foams containing polymers such as polystyrene, polyvinyl chloride, polyvinyl acetate, polypropylene and polyethylene are brittle and shatter or crumble when they are compressed. In contrast the foams of the invention are spongy and stable over a wide temperature range.

*Example E*

A resin encapsulated blowing agent was prepared in the following manner: 30 grams of Elvax 250 was dissolved in warm benzene. 50 grams of gypsum was added to the solution and the mixture poured out on a flat surface to allow the benzene to evaporate. A foam was made in the manner previously described employing 100 grams of asphalt, 15 grams of Elvax, 2 grams of lithium hydride dispersed in Buton resin (50:50) and 7 grams of Elvax coated gypsum blowing agent (50:30). The foaming reaction proceeded smoothly indicating the moderating effect of the resin coating on the gypsum and the resulting foam had a density of about .5. It is believed that the use of resin encapsulated blowing agents results in a localized toughening around the foam pores in the asphalt matrix.

The foams of the invention can be modified by the addition of fillers, plasticizers, surface active agents, dyes, antioxidants, fireproofing agents and the like. Other obvious modifications are intended to be included within the scope of the disclosure.

We claim:
1. A process for the preparation of an improved foam composition comprising the steps of heating a homogeneous mixture of a major amount of asphalt and a minor amount of a resinous copolymer of ethylene and vinyl acetate to a temperature in the range of from about 400–700° F. adding a conventional blowing agent and foaming the mixture.

2. The product produced by the process of claim 1.

3. A process for the preparation of an improved foam composition comprising the steps of heating a homogeneous mixture of 50 to 95 wt. percent asphalt having a ring and ball melt point in the range of from about 150°–350° F. and from 5 to 50 wt. percent of a resinous copolymer of ethylene and vinyl acetate having a ring and ball melt point in the range of from about 230 to 290° F. to a temperature of from about 400–700° F., dispersing an alkali metal hydride in the mixture, foaming the mixture, then dispersing gypsum in the mixture and recovering the resulting foam product.

4. The product produced by the process of claim 3.

5. Process according to claim 3 wherein the gypsum is coated with a solid thermoplastic resin selected from the group consisting of polyethylene, polypropylene and copolymers of ethylene and vinyl acetate.

References Cited by the Examiner

UNITED STATES PATENTS 2,871,212  1/59  Thayer _____ 260—28.5
2,981,361  4/61  Schofield _____ 260—2.5
3,138,471  6/64  Hedman et al. _____ 260—2.5

MURRAY TILLMAN, *Primary Examiner.*

JAMES A. SEIDLECK, *Examiner.*